United States Patent [19]

Poisel et al.

[11] Patent Number: 5,373,361
[45] Date of Patent: Dec. 13, 1994

[54] FIBER OPTIC GYROSCOPE INCLUDING A 3×3 COUPLER AND A CONTRAST ADJUSTING ELEMENT

[75] Inventors: Hans Poisel, Dachau; Gert Trommer, München; Ulrich Reinhard, Buchholz, all of Germany

[73] Assignee: Deutsche Aerospace Patentabteilung, Ottobrunn, Germany

[21] Appl. No.: 962,749

[22] Filed: Oct. 19, 1992

[30] Foreign Application Priority Data

Oct. 17, 1991 [DE] Germany .............................. 4134312

[51] Int. Cl.⁵ ................................................ G01C 19/72
[52] U.S. Cl. ................................................... 356/350
[58] Field of Search ........................ 356/345, 350, 351

[56] References Cited

U.S. PATENT DOCUMENTS

| | | | |
|---|---|---|---|
| 4,342,517 | 8/1982 | Johnson et al. | 356/350 |
| 4,372,685 | 2/1983 | Ulrich | 356/350 |
| 4,440,498 | 4/1984 | Sheem . | |

FOREIGN PATENT DOCUMENTS

| | | |
|---|---|---|
| 3006580 | 2/1980 | Germany . |
| 3912005 | 10/1990 | Germany . |
| 3942819 | 6/1991 | Germany . |

*Primary Examiner*—Samuel A. Turner
*Attorney, Agent, or Firm*—Evenson, Mckeown, Edwards & Lenahan

[57] ABSTRACT

A fiber optic gyroscope of the type having a 3×3 coupler located between a light source and a monomode fiber coil, coupling nonpolarized light into the coil end, and at least one photodetector element associated with the coupler to generate an output signal corresponding to the light intensity transmitted by the coupler. At least one contrast-adjusting element in the form of a rotationally polarizing fiber section is located between the connection on the coil side, of the 3×3 coupler in the length of the coil-forming monomode fiber strand. The polarization rotation angle of said fiber section is adjusted so that the output signal of the photodetector element is minimal when the gyroscope is at rest.

5 Claims, 1 Drawing Sheet

5,373,361

FIBER OPTIC GYROSCOPE INCLUDING A 3×3 COUPLER AND A CONTRAST ADJUSTING ELEMENT

BACKGROUND AND SUMMARY OF THE INVENTION

The invention relates to a fiber optic gyroscope.

It is known that the contrast of the interference signal generated by a fiber optic gyroscope is adversely influenced by polarization coupling centers in the light fiber path. In some fiber optic gyroscopes, this interference in coupler/fiber coil arrangements to produce polarization is limited to splices between individual fiber segments, and can be compensated, albeit at high construction cost, by a highly exact alignment of the fiber ends during the splicing process to ensure that they are flush with one another regarding the main polarization axes. However, in newer fiber optic gyroscopes of the type disclosed known for example in U.S. Pat. No. 4,440,498 or in German Patent Document DE-OS 3 912 005, having a 3×3 coupler and a monomode fiber coil, and operating on the basis of the inherent phase shift at the quadrature point, such contrast impurity centers are present in the monomode fiber strand itself, and cannot be eliminated by splicing the fiber ends to achieve polarization. For this reason the above-mentioned German Patent Document provides for contrast-independent signal evaluation using three-point light-intensity measurement; but this technique fails when the contrast tends toward zero as a result of an unfavorable arrangement of the coupling centers in the fiber coil.

The goal of the present invention is to provide a fiber optic gyroscope which achieves maximum contrast of the interference signal in the monomode fiber coil in a structurally simple fashion, and independently of interfering coupling effects.

This goal is achieved according to the invention by combining a fiber section that produces rotational polarization, with a nonpolarizing, coil-forming monomode fiber strand. Accordingly, the transfer characteristics of the resultant total system are modified so that the phase shift caused by cross coupling in the fiber coil is effectively eliminated by deliberately opposite polarizing rotation in the inserted fiber segment, thus resulting in an interference signal with maximum contrast.

An important feature of the invention is that the required polarization rotation angle can be set to the correct value with very low adjustment cost.

Another important aspect of the invention is the incorporation of the rotationally polarizing fiber section into the monomode fiber strand, without the polarization rotation angle having to be adjusted in advance in a costly fashion before the fiber ends are joined. This is achieved by splicing the fiber section into the coil forming monomode fiber, with the fiber section being in an unadjusted state relative to the polarization rotation angle. The fiber section is then twisted around its lengthwise axis in the completely spliced state until the minimum output signal is achieved, with at least the twisted end of the fiber section adjoining a nominally nonpolarizing fiber. In this manner it is possible to avoid the situation in which the nonpolarizing fiber undergoes reverse rotation of the light that could render the desired contrast maximization ineffective, upon twisting of the spliced fiber section end. For this purpose, in one embodiment a circularly double-refracting fiber is used as the rotationally polarizing fiber section, or preferably a fiber that is linearly double-refracting fiber before twisting.

In another advantageous embodiment of the invention, a monomode fiber section is provided as the contrast-adjusting fiber section and is twisted to produce circular double refraction until the polarization rotation angle is reached, and is spliced endwise in the twisted state. This has the advantage that the contrast-adjusting fiber section and the fiber coil can be made from a single monomode fiber, and those twisting-angle errors caused by manufacturing which cannot be corrected after the splicing process, have only a relatively minor influence on contrast maximization, since the twisting angle required to produce circular double refraction in a monomode fiber section is many times (in the case of quartz glass fibers approximately six times), higher than the polarization rotation angle achieved. Thus, when circular double refraction is adjusted before the fiber section is spliced, highly desirable reduction of adjustment sensitivity is achieved.

To further facilitate manufacturing, especially as regards the minimum number of additional splices required for insertion of the rotationally-polarizing fiber section, the fiber section can be mounted at the end of the fiber coil facing the coupler; that is, using a splice that would be required in any event to connect it directly to the coupler.

Other objects, advantages and novel features of the present invention will become apparent from the following detailed description of the invention when considered in conjunction with the accompanying drawings.

DETAILED DESCRIPTION OF THE DRAWINGS

Figure 1:
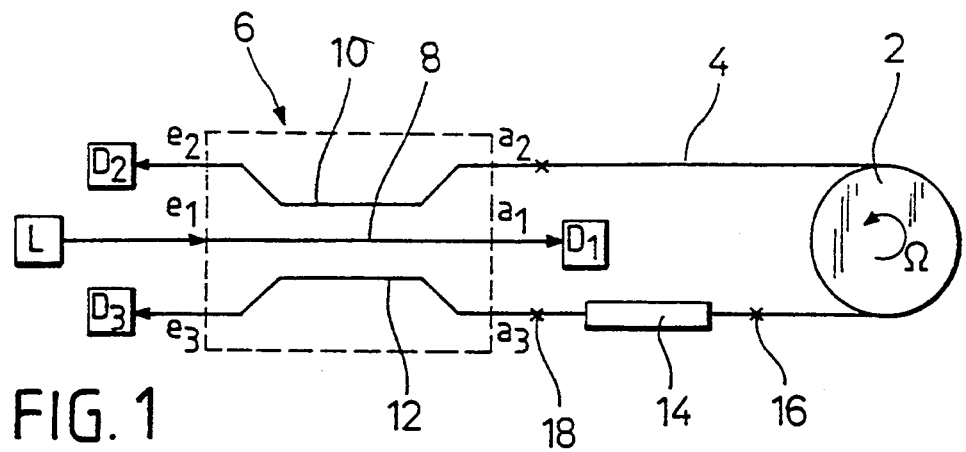
FIG. 1 is a fiber optic gyroscope according to the invention.

The fiber optic gyroscope shown in FIG. 1 contains as its principal components a fiber coil 2, consisting of a nominally nonpolarizing monomode fiber 4, as well as a 3×3 coupler 6 with three transmission fibers 8, 10, and 12, also of the nonpolarizing monomode type fused together. The central fiber 8 has its input $e_1$ connected to a light source L of nonpolarized light and its output $a_1$ connected to a photodiode, while the other two transmission fibers 10 and 12 have their connections $a_2$ and $a_3$ at the same end as photodiode $D_1$, each abutting a fiber coil end, and their opposite connections $e_2$ and $e_3$ abutting additional photodiodes $D_2$ and $D_3$ respectively. To this extent, the fiber optic gyroscope is of a design known from the above-mentioned German Patent Document DE-OS 3 912 005, with output signals $P_2$ and $P_3$ from photodiodes $D_2$ and $D_3$ being a function of the Sagnac phase shift $\phi_s$, linked to the angular velocity n of the fiber optic gyroscope and the scaling factor s corresponding to the equation $\phi_s = s \cdot \Omega$. With the aid of the output signals from photodiodes $D_1$, $D_2$, and $D_3$, the angular velocity of the fiber optic gyroscope can be determined independently of the respective contrast value in order to compensate for environmentally produced fluctuations and contrast. It is a prerequisite, however, that the contrast factor be significantly different from zero, which is not always guaranteed.

For this reason, and to produce a significantly improved signal/noise ratio, in the fiber optic gyroscope shown in FIG. 1, a contrast adjusting element 14 in the form of a rotationally polarizing fiber section, is inserted between one end of monomode fiber coil 2 and the associated connection a3 of coupler 6 through splices 16 and 18, in order to maximize contrast. Fiber section 14 is linearly double-refracting, and twisting it between its ends produces a circularly double-refracting transmission characteristic. The addition of rotationally polarizing fiber section 14 to monomode fiber strand 4 changes the polarization properties of the light-transmission section to produce maximum contrast in the complete system composed of coil 2 and fiber section 14. Then the polarization rotation angle $\theta$ of fiber section 14 must be chosen such that $$\theta = \arcsin\left(\sqrt{\frac{\alpha \sin^2 \eta}{(1 - \alpha) \sin^2 \xi + \alpha \sin^2 \eta}}\right)$$

Here, $\alpha$ is a measure of the number of coupling centers in fiber coil 2, where x polarization is changed to y polarization and vice versa. $\epsilon$ is the phase shift resulting from effective double refraction of fibers 4 and $\eta$ is the phase shift additionally produced by cross coupling in fiber coil 2. By including the circular double refraction at fiber section 14 with the polarization rotation angle e adjusted according to the above equation, the phase shift total in $\eta_{total}$ transmission section 4 and 14 is brought to zero, so that contrast factor k rises to a value of 1.

Figure 3:
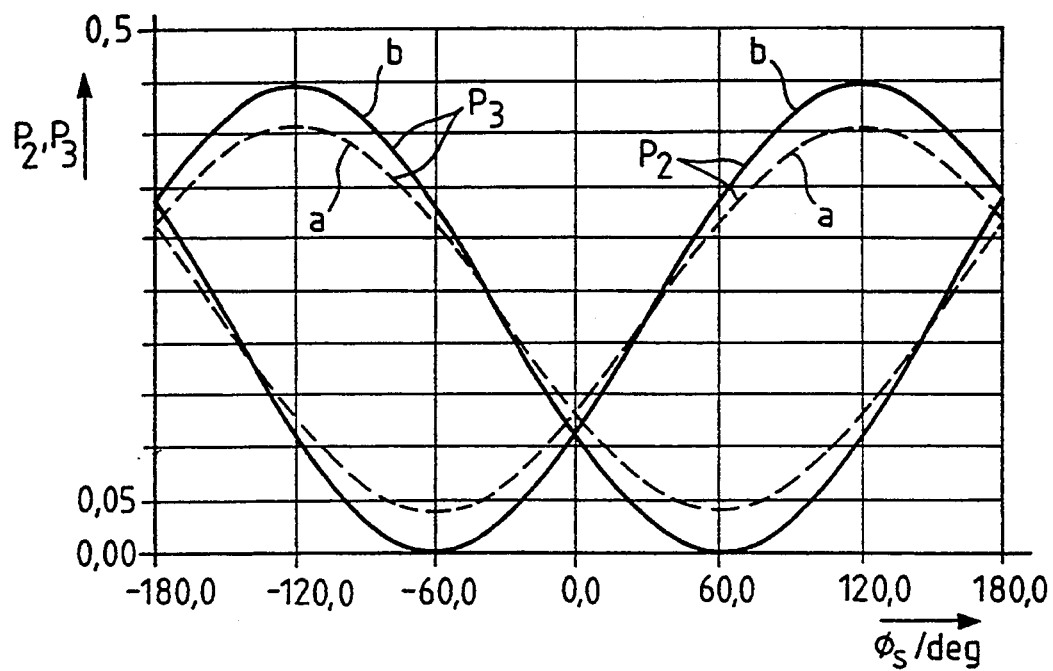
FIG. 3 shows the path of the photodetector output signals as a function of the Sagnac phase of the fiber optic gyroscope, with and without a rotationally polarizing fiber section inserted.

The result of contrast maximization is shown in FIG. 3 using the signal pattern of photodiode output signals $P_2$ and $P_3$ from photodiodes $D_2$ and $D_3$ respectively. Curves a are valid for a conventional monomode fiber strand 4, (that is, without contrast-optimizing fiber section 14), with values of $\alpha = 0117$, $\epsilon = 40°$, and $\eta = 60°$ producing a contrast k of 0.82. By introducing circular double refraction by utilizing fiber section 14 with a rotational angle $\Theta$ of 26.12°, curves b are obtained for the fiber optic gyroscope. In other words, the contrast is increased to the full value of k=1.

Figure 2:
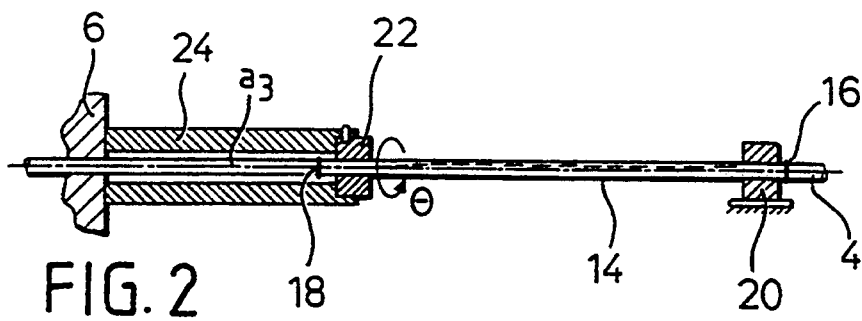
FIG. 2 is an enlarged partial view of the fiber optic gyroscope according to FIG. 1 in the area of the rotationally polarizing fiber section.

As can be seen from curves a and b in FIG. 3 (which can also be determined analytically), output signal $P_2$ or $P_3$ with the gyroscope at rest (in other words when $\phi_s = 0$), is minimal when the contrast reaches its maximum value. This characteristic can be utilized for simple adjustment of the required rotation polarization angle $\Theta$ of fiber section 14, the latter (in an initially untwisted state) being connected first by splice 16 to the end of the fiber coil and then by splice 18 to coupler connection e3. For this purpose, fiber section 14 is nonrotatably mounted in the vicinity of its coil end by a holder 20 (FIG. 2), while the other end of fiber section 14 facing the coupler is fastened to an adjusting element 22 whose direction of rotation can be adjusted. With the gyroscope at rest, turning adjusting element 22 twists fiber section 14 about its longitudinal axis until output signal $P_2$ and/or $P_3$ has been adjusted to the lowest possible value. Maintaining this twist (i.e., in the above numerical example with a twisting angle of 26.12°), fiber section 14 is then mounted permanently, for example by nonrotational securing of adjusting element 22 to a housing part 24 of coupler 6.

In an alternative embodiment, an end section of monomode fiber strand 14 that is 0.5 to 1 m long, can be used as the rotationally polarizing fiber section 14, so that splice 16 can be eliminated. In this case, the monomode fiber section is fastened to holder 20 before being spliced to terminal a3, while at its free end, to produce circular double refraction, it is elastically twisted on its lengthwise axis. Consequently, the resultant rotational polarization angle e of monomode fiber section 14 is several times smaller than the mechanical twisting angle (in the case of quartz glass fibers for example, by approximately a factor of six). Thus, to obtain the rotational polarization of 26.12° used in the above numerical example in monomode fiber section 14, a twisting angle of approximately 155° must be chosen. Variations from the specified twisting angle have only a very minor influence on the desired contrast optimization. Once twisted, fiber section 14 is again permanently attached and then spliced to terminal a3 of coupler 6. Any twisting error that may be present can be adjusted by observing output signal $P_2$ and/or $P_3$, provided that rotation of the light by an equal amount but in the opposite direction is not caused when connecting fiber 12 of coupler 6. In any event, in this embodiment as well, a contrast factor can easily be guaranteed that is sufficiently different from zero to allow contrast-independent signal evaluation according to the above-mentioned German Patent Document.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Fiber optic gyroscope comprising:
   a source of nonpolarized light;
   a monomode fiber coil
   a 3×3 optical coupler coupled between said light source and said monomode fiber coil, to transmit nonpolarized light into ends of said coil;
   at least one photodetector coupled to generate an output signal corresponding to intensity of light transmitted by said coupler;
   at least one contrast adjusting element comprising a rotationally polarizing fiber section coupled between said monomode fiber coil and a terminal of the 3×3 coupler, a rotational polarization angle of said rotationally polarizing fiber section being adjusted so that output signals of said at least one photodetector are minimized when said gyroscope is at rest.

2. Fiber optic gyroscope according to claim 1, wherein said rotationally polarizing fiber section, in an untwisted state, is spliced end-to-end at first and second ends thereof with fibers which form said fiber coil, the fiber spliced to at least one of said first and second ends being of a type that does not polarize; said rotationally polarizing fiber section being fixedly mounted at said first end and being mounted rotatably about a longitudinal axis thereof at said second end, whereby output signals of said gyroscope may be adjusted by rotatably positioning said rotatably mounted end of said fiber section depending on a rotational polarization angle of said coil.

3. Fiber optic gyroscope according to claim 2, wherein said rotationally polarizing fiber section is linearly double refracting.

4. Fiber optic gyroscope according to claim 1, wherein said rotationally polarizing fiber section is a monomode fiber section, said fiber section being twisted to produce circular double refraction until optimal polarization rotation angle $\Theta$ is reached, and being attached and spliced into said monomode fiber in the twisted state.

5. Fiber optic gyroscope according claim 1, wherein the rotationally polarizing fiber section is located in the vicinity of an end segment of the fiber coil, on the coupler side.

* * * * *